United States Patent [19]
Taskett

[11] Patent Number: 5,923,734
[45] Date of Patent: Jul. 13, 1999

[54] METHODS AND APPARATUS FOR PROVIDING A PREPAID, REMOTE MEMORY TRANSACTION ACCOUNT WITH VOICE INDICIA

[75] Inventor: John M. Taskett, Salt Lake City, Utah

[73] Assignee: American Express TRS, New York, N.Y.

[21] Appl. No.: 08/977,981

[22] Filed: Nov. 25, 1997

Related U.S. Application Data

[63] Continuation of application No. 08/612,256, Mar. 7, 1996, abandoned.

[51] Int. Cl.$^6$ ..................................................... H04M 1/64
[52] U.S. Cl. ........................ 379/88.25; 379/144; 379/357; 705/408
[58] Field of Search ................................ 379/67.1, 88.22, 379/88.23, 88.24, 88.25, 111, 112, 144, 357; 705/28, 29, 401, 408

[56] References Cited

U.S. PATENT DOCUMENTS

| | | | |
|---|---|---|---|
| 5,251,251 | 10/1993 | Barber et al. | 379/357 |
| 5,287,603 | 2/1994 | Atkins et al. | 379/144 |
| 5,438,615 | 8/1995 | Moen | 379/112 |
| 5,469,497 | 11/1995 | Pierce et al. | 379/144 |

OTHER PUBLICATIONS

"Protocall 2000" Issued by Harris on 1995.
Novell's Prepaid Calling Card, Issued by Jack Nadel,Inc. on 1995.

*Primary Examiner*—Fan S. Tsang
*Attorney, Agent, or Firm*—Snell & Wilmer L.L.P.

[57] ABSTRACT

An improved distributed system for effectuating commercial transactions by a consumer is provided. The system includes a service provider network or host system which comprises an account database of prepaid accounts and an audio library containing audio indicia or sound bites. A prepaid instrument is issued to a consumer for providing access to the service provider network, the audio library, and the account database. The prepaid instrument has two sides. On one side of the instrument is a visual indicia such as a photograph, drawing, picture, or other image. On the other side of the instrument is a telephone number for accessing the host system and the audio library containing audio indicia that relates to the visual indicia on the prepaid instrument, and a predetermined authorization code that allows access to the account database. While connected to the service provider network, audio indicia relating to the visual indicia on the prepaid instrument is suitably communicated to the consumer at appropriate times or intervals.

17 Claims, 6 Drawing Sheets

METHODS AND APPARATUS FOR PROVIDING A PREPAID, REMOTE MEMORY TRANSACTION ACCOUNT WITH VOICE INDICIA

This application is a continuation of application Ser. No. 08/612,256 filed Mar. 7, 1996, now abandoned.

TECHNICAL FIELD

The present invention relates, generally, to prepaid, remote memory accounts used by a consumer with a transaction card to purchase goods and services and, more particularly, to methods and apparatus which permit the remote memory account to communicate to the consumer using prerecorded voice prompts associated with famous personalities and related to the transaction card.

BACKGROUND ART AND TECHNICAL PROBLEMS

Remote memory, prepaid accounts for use in purchasing goods and services are generally well known. Presently known schemes typically involve a printed transaction card, for example a wallet-sized plastic or cardboard card, which bears on one side a unique authorization or account number and instructions for access to funds, services, and the like. Often, the other side of the transaction card includes a photograph, drawing or other aesthetically pleasing image. Such prepaid cards have been used extensively throughout the world. One such example is the use of these remote memory cards as prepaid long distance telephone calling cards.

In contrast to stored value cards (e.g., "smart cards") wherein a remaining account balance is stored in a memory circuit resident in the card, remote memory systems typically store information pertaining to a prepaid account at a central host computer. The host computer typically stores information relating to the available balance remaining in the account, as well as information pertaining to past activity associated with the account. In particular, the host computer may store transaction data relating to various goods or services purchased using the card. In the context of a prepaid telephone calling card, the host computer may store call record data, including the date, time, duration, and various other parameters relating to calls which were placed using the prepaid telephone card corresponding to the account. The host computer may be accessed via a telephone or data line by the consumer through the use of an authorization code, Personal Identification Number (PIN), or the like.

The use of prepaid remote memory telephone cards is particularly prevalent in the United States. A typical prepaid telephone calling card includes a toll-free telephone number used by a consumer to access a host computer system, a unique authorization code associated with the card (and, hence, the corresponding remote account), and dialing instructions. When a customer desires to use the card to place a long distance call, he dials the toll-free number, thereby accessing the host system which manages the remote accounts. The consumer then enters a predetermined authorization number for allowing access to the database. Next, the consumer then enters the desired long distance telephone number, and the system connects the consumer with the desired calling destination. Long distance telephone charges attributed to the telephone call are deducted from the remaining balance, and the call is terminated when the account is fully consumed. A call history may also be maintained by the host for each account, which call history includes information pertaining to the calls charged to the various accounts.

Prepaid calling cards are employed in a wide variety of applications for both personal and professional use. For example, various governmental entities and other employers often issue per diem cards to employees to accommodate employee travel; the per diem cards may be issued in predetermined amounts (e.g., $100), and permit a traveling employee to charge gasoline, rental cars, hotels, meals, and telephone calls to the prepaid account. When the charges equal the prepaid limit, the card may simply be discarded; alternatively, the card may be "recharged" by the employer, as desired. In addition, various prepaid instruments are becoming increasingly popular as gift cards, on college campuses for purchasing school and living supplies, and for use at resorts, vacation areas, theme parks, sports stadiums, and the like.

As the number of card issuers increases and the calling schemes become more standardized, it becomes more challenging for an issuer of transaction cards to distinguish his product from others. A system and method is thus needed which permits an issuer to market his cards in a manner which distinguishes over the standard transaction card.

SUMMARY OF THE INVENTION

The present invention provides an improved distributed system for effectuating commercial transactions by a consumer. This system includes a service provider network or host system which comprises an account database of prepaid accounts and an audio database containing audio indicia or sound bites. A prepaid instrument (e.g., a phone card) is issued to a consumer for providing access to the service provider network, the audio database, and the account database. In a preferred embodiment, the prepaid instrument has two sides. One side displays a photograph or other visual indicia such as a printed drawing or other aesthetically pleasing image. The other side of the instrument provides a telephone number for accessing the host system and a portion of the audio database containing audio indicia which is related to the visual indicia on the prepaid instrument, and a predetermined authorization code that allows access to the account database. While connected to the service provider network, audio indicia corresponding to the visual indicia on the prepaid instrument is communicated over the telephone to the user at appropriate times or intervals.

In accordance with one embodiment of the invention, the prepaid transaction instrument comprises a prepaid telephone card. On the front side of the prepaid telephone card is an image or photograph of a living or deceased person such as a famous celebrity. The back side of the telephone card comprises an access telephone number and a predetermined authorization code. A service provider network or host system comprises an account database of prepaid accounts and a voice library or storage facility containing voice snippets of persons pictured on the front of prepaid telephone cards. Upon dialing the access telephone number, a reproduction (e.g., recording) of the voice of the person pictured on the telephone card is communicated over the telephone line to the user of the card. The voice may provide instructions on using the telephone card or may prompt the user for additional information such as the predetermined authorization code for accessing the account database and the desired long distance phone number.

In accordance with another embodiment of the present invention, an image such as an animal, musical instrument, automobile or the like may be displayed on the front side of a telephone card. An audio sound bite relating to (or, alternatively, independent of) the image on the telephone card is then relayed to the user of the card upon connection to the service provider network. For example, in the case of an antique automobile pictured on the front side of the telephone card, sounds associated with that automobile may be communicated to the user of the phone card when the service provider network is accessed.

In accordance with another aspect of the present invention, an ensemble or "package" comprising a transaction instrument (e.g., a calling card) and various related paraphernalia may be sold together in an envelope, for example a trading card, a postage stamp, or series of postage stamps having an image substantially similar or identical to the photograph or other visual indicia on the front side of the telephone card.

BRIEF DESCRIPTION OF THE DRAWINGS

The present invention will hereinafter be described in conjunction with the appended drawing figures, wherein.

DETAILED DESCRIPTION OF PREFERRED EXEMPLARY EMBODIMENTS

A preferred exemplary embodiment of the present invention surrounds a prepaid telephone card; however, it will be understood that the invention is not so limited. In particular, it will be appreciated that the present invention broadly contemplates virtually any type of prepaid transaction card instrument or methodology for virtually any type of goods or services of whatever kind or nature. Although the present invention contemplates stored value cards (e.g., smart cards), a preferred exemplary embodiment described herein surrounds a prepaid, remote memory account telephone card which provides dialing instructions for permitting the holder of the card to make toll-free telephone calls from virtually any telephone extension.

Prepaid calling cards may be purchased from a variety of retail outlets, for example, convenience stores, drug stores, gas stations, supermarkets, and the like. For a more thorough discussion of prepaid instruments and telephone cards, see U.S. patent application Ser. No. 08/456,525 entitled Methods and Apparatus for Providing a Prepaid, Remote Memory Customer Account, and Ser. No. 08/458,715 entitled Refundable Prepaid Telephone Card, both filed Jun. 1, 1995, by John Taskett; Ser. No. 08/510,590 entitled Methods and Apparatus for Providing a Prepaid, Remote Entry Customer Account for the Visually Impaired, filed in the names of John Taskett and Barbara Piernot on Aug. 2, 1995; Ser. No. 08/510,196, entitled Methods and Apparatus for Providing a Prepaid, Remote Entry Customer Account for the Hearing Impaired, filed in the name of John Taskett on Aug. 2, 1995; and serial number (not yet assigned) entitled Methods and Apparatus for Providing a Prepaid, Remote Entry Customer Account Having Multiple Language Capability, filed in the name of John Taskett on Nov. 7, 1995. The entire disclosures of these patent applications are incorporated herein by this reference.

Figure 1:
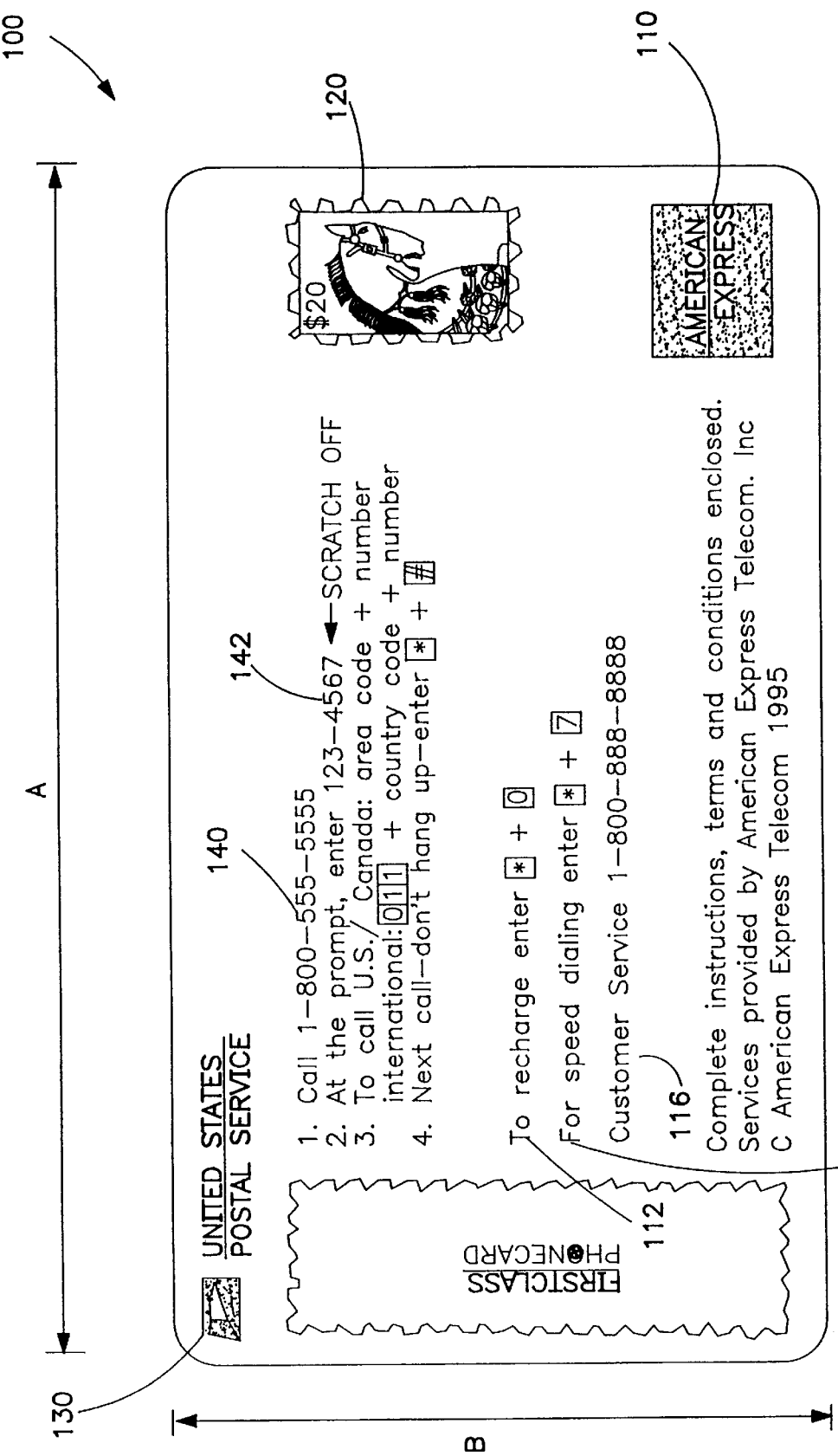
FIG. 1 is a view of one side of an exemplary telephone card in accordance with the present invention.

Referring now to FIG. 1, an exemplary telephone card 100 is analogous in its physical embodiment to a credit card-like instrument, being comprised of paper, plastic, cardboard or any other convenient material. In a preferred embodiment, card 100 comprises plastic and has a length on the order of 8.5–8.7 cm (dimension "A"), a height on the order of 5.3–5.5 cm (dimension "B"), and a thickness on the order of 0.65–0.85 mm.

With continued reference to FIG. 1, telephone card 100 comprises an access telephone number 140 for accessing a service provider network including an audio database, and an authorization code 142 for accessing an account database. The service provider network, audio database, and account database are described in greater detail below.

Access telephone number 140 may be a toll-free 800 number, a 900 number, a local phone number or the like. In a preferred embodiment, access phone number 140 is assigned according to the image or photograph pictured on the other side of phone card 100; that is, a unique, corresponding access phone number is established for a particular famous person shown on the card. Alternatively, a single access hone number may be employed for a plurality of personalities, whereby the caller selects from a menu of personalities once connected to the service provider.

Authorization code 142 is a number which is preferably unique to a particular telephone card. In the illustrated embodiment, authorization code 142 is a unique predetermined number that is printed on telephone card 100 before it is issued to the consumer. However, in accordance with another aspect of the invention, code 142 may be a number that is selected by the individual user by having the user inform the service provider of the selected code so that a corresponding account may be set up in the account database of the host computer.

In accordance with the illustrated embodiment, user-friendly instructions may be set forth on one side of card 100 to explain to the consumer how to place phone calls. For example, card 100 may instruct the user to dial access telephone number 140 to access the host computer which maintains the account from which "funds" are "withdrawn" or otherwise consumed as a consequence of the long distance telephone calls made in accordance with instrument 100 (line 1). Thereafter, instrument 100 instructs the user (line 2) to enter authorization code 142. In accordance with a further aspect of the present invention, a bar code or other suitable indicia (e.g., magnetic strip) of authorization code 142 may also be exhibited on instrument 100, for allowing authorization code 142 to be read by a bar code reader or other scanning device. This would alleviate the need for manual entry of authorization code 142 by the user.

The user is then instructed to dial a desired destination telephone number (line 3) either in his local country (e.g., U.S./Canada) and/or internationally. Information may also include instruction for placing additional calls (line 4).

With continued reference to FIG. 1, exemplary telephone card 100 provides an instruction 112 on how to "recharge" card 100 with additional telephone time, an instruction 114 on how to use a speed-dialing feature, and an instruction 116 on how to contact customer service.

If desired, additional information may be suitably printed on card 100 such as one or more trademarks or service marks 110 of the issuer of card 100 or trademarks or service marks 130 for advertising various related or unrelated products. In addition, a photograph or image 120 configured to resemble a postage stamp may be appropriately placed on the instruction side of card 100 so that telephone card 100 resembles a picture postcard. In a preferred embodiment, image 120 is reduced in size but is otherwise identical to the image on the reverse side of card 100 as well as postage stamps issued with telephone card 100 (see FIG. 6).

It is noted that FIG. 1 is illustrative only and that given the robust configuration of the present invention, virtually any additional information or data may be set forth on card 100.

Figure 2:
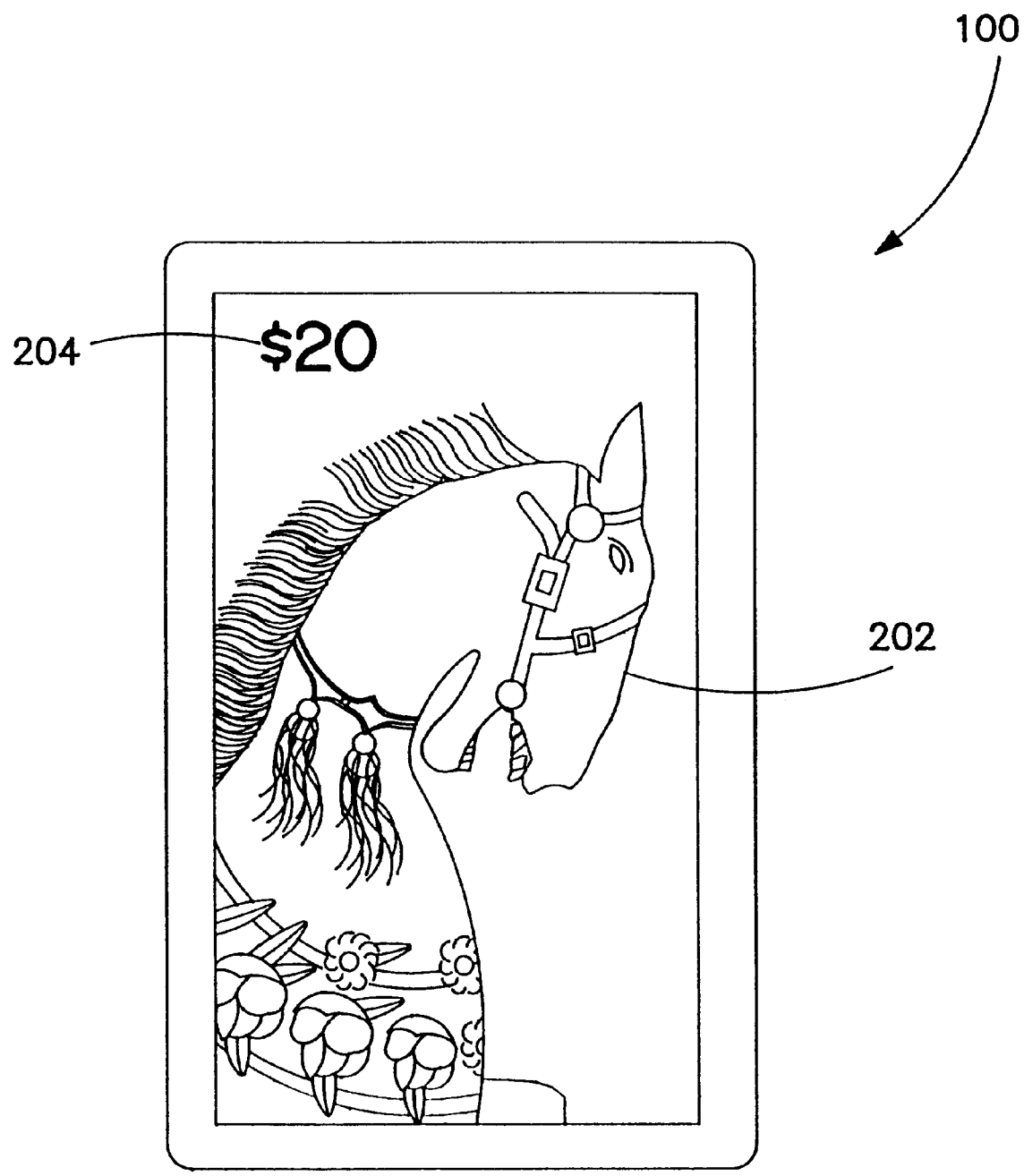
FIG. 2 is a view of the other side of the prepaid telephone card of FIG. 1.

Referring now to FIG. 2 and as mentioned above, the opposite side of telephone card 100 comprises suitable visual indicia 202 of the any desired image which may include a photograph, reproduction, drawing or sketch of virtually any subject matter such as a living or deceased person(s) (e.g., actor, artist, political or military figure, or the like), animals, scenic locations, musical instruments, automobiles, or the like. When a user connects to the service provider using phone number 140, portions of audio indicia stored in an audio database or library and relating to visual indicia 202 are selectively communicated to the caller at appropriate times or intervals. For example, in the case when visual indicia 202 is a picture of a horse, sounds associated with a horse may be communicated to the user of card 100 when the service provider is accessed.

In a preferred embodiment, visual indicia 202 comprises a photograph or drawing of a living or deceased person or celebrity such as Elvis Presley, Marilyn Monroe, James Dean, or the like. Upon dialing access phone number 140 and accessing the service provider network, a reproduction (e.g., recording) of the voice of the celebrity stored in the voice library or voice storage facility is played back to the user of card 100. The voice of the celebrity may provide instructions on using telephone card 100 or may prompt the user for additional information such as authorization code 142 and the desired long distance phone number. In the case of deceased celebrities, the voice for the instructions may be obtained by taking snippets or sound bites from taped interviews, movies, records, and other recordings. These voice snippets are then sorted and stored in the voice library until retrieved by the host computer.

With continued reference to FIG. 2, an initial stored value number 204 may be printed on transaction card 100 to indicate the value or initial amount associated with telephone card 100. Typically, the initial prepaid amount of card 100 ranges from one dollar to several hundred dollars or more (or foreign currency equivalent). Of course, once card 100 is used, the value of telephone card 100 may fluctuate as long distance telephone charges reduce the remaining balance in the charge, and as the user "recharges" the balance in the charge account. In accordance with another aspect of the invention, the host computer may inform the user of card 100 of the current balance of the account when accessing the service provider network.

Figure 3:
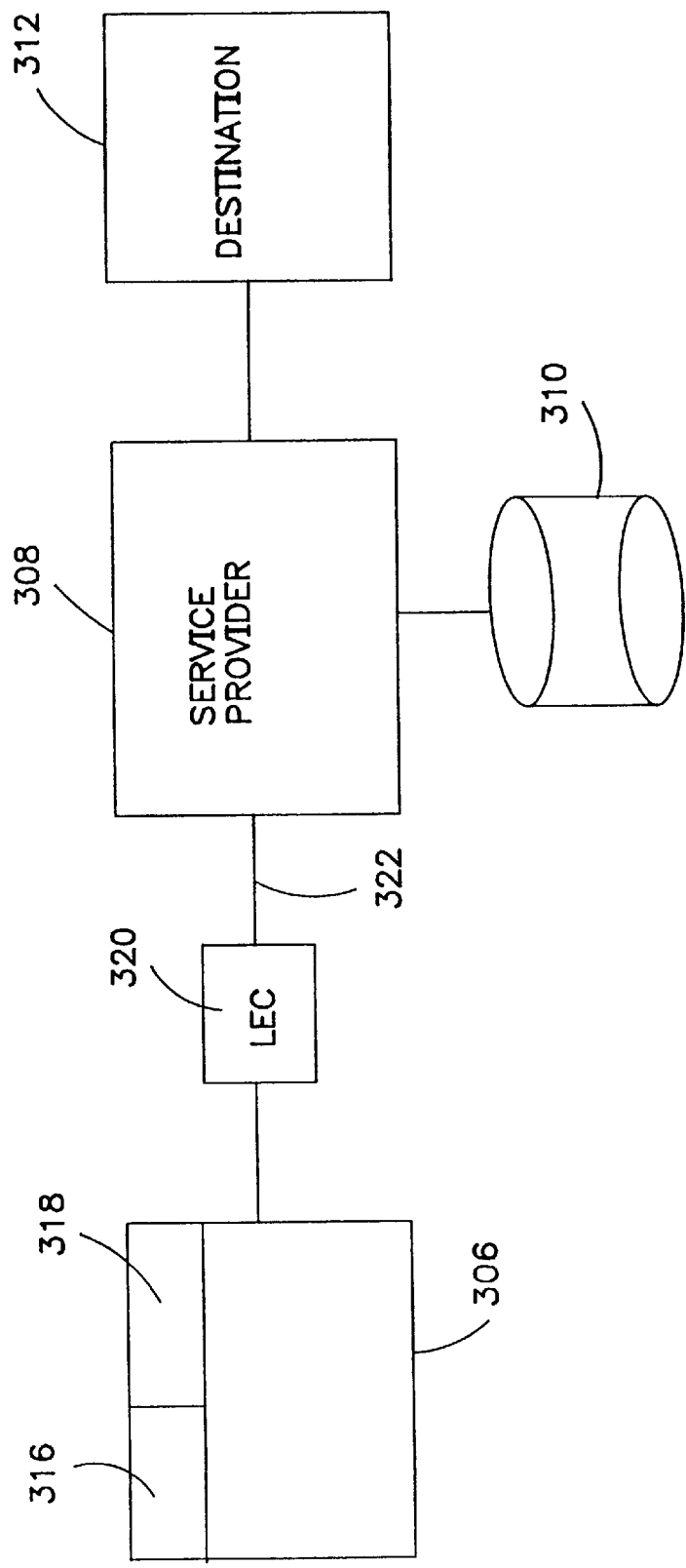
FIG. 3 is a schematic block diagram wherein the telephone card of FIGS. 1 and 2 is used in the context of a long distance telephone service system.

Referring now to FIG. 3, a distributed transaction system suitably comprises a network service provider (host computer network) 308 having a database 310 associated therewith and a calling party module 306 configured to communicate with host computer network 308 via a communications link 322. In a preferred embodiment where caller module 306 comprises a telephone, the caller is suitably routed to service provider 308 by way of a Local Exchange Carrier (LEC) 320.

In the embodiment shown in FIG. 3, service provider network 308 comprises telephone switching equipment suitable for connecting long distance telephone calls. Alternatively, service provider 308 may be connected electronically to a remote long distance carrier (not shown) in order to facilitate the completion of long distance telephone calls.

In accordance with one aspect of the present invention, the functions of service provider 308 may suitably be performed by a financial institution, credit card issuer, telephone company or other entity issuing telephone cards 100. Those skilled in the art will appreciate that service provider 308 includes suitable computing hardware for effecting the functions set forth herein.

Figure 4:
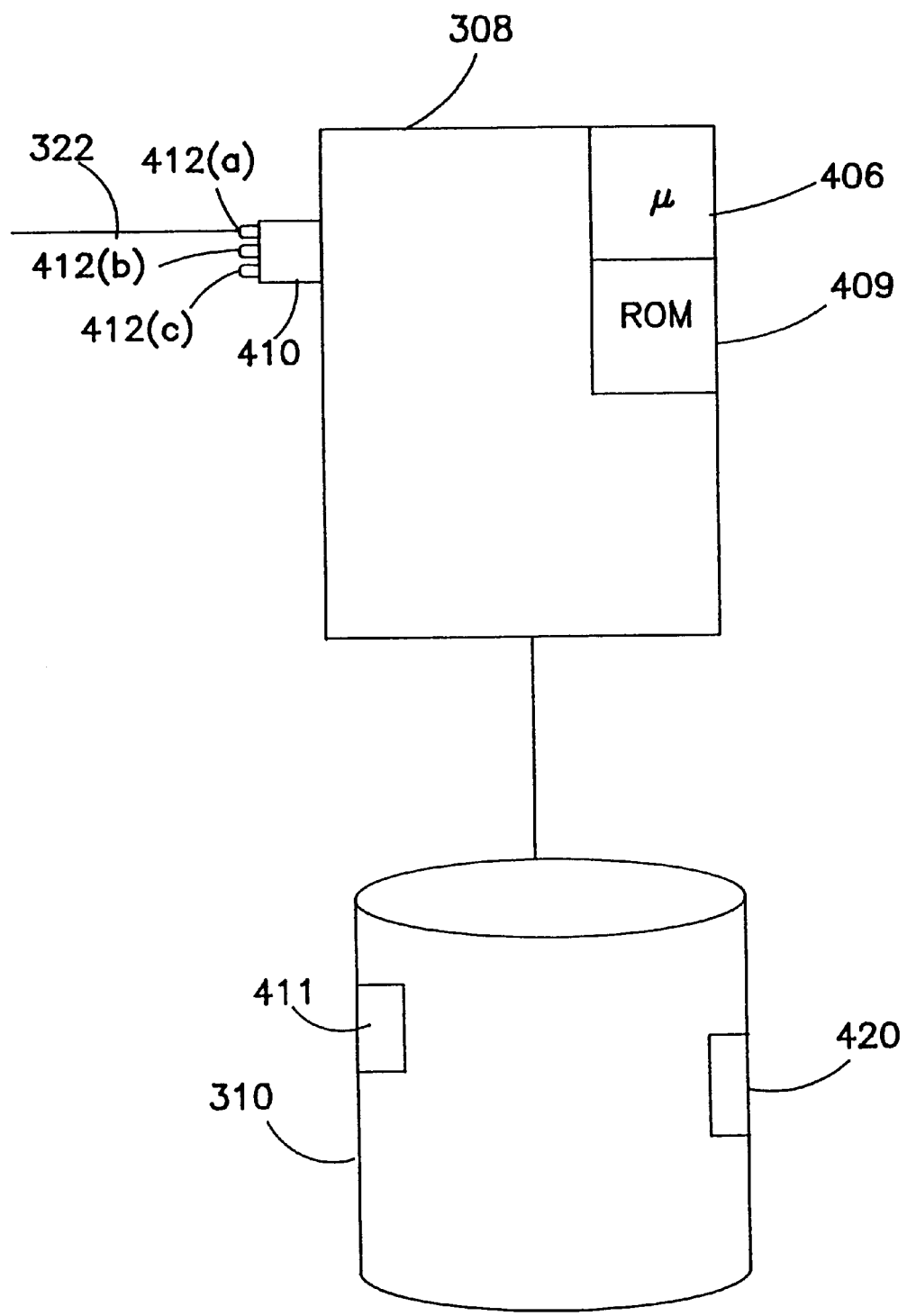
FIG. 4 is a schematic diagram of an exemplary host computer system in accordance with the present invention.

Referring now to FIG. 4, host system 308 suitably comprises an incoming call trunk 410, a controller 406, and a ROM 409. Trunk 410 suitably comprises one or more incoming telephone lines 412(a)–412(c). In a preferred embodiment, first incoming line 412(a) corresponds to a first predetermined telephone number (e.g., all Elvis Presley telephone cards). Similarly, second incoming line 412(b) corresponds to a second predetermined telephone number (e.g., all Marilyn Monroe phone cards), third incoming line 412(c) corresponds to a third predetermined telephone number (e.g., all antique automobile phone cards) and so on. In an alternate embodiment, each incoming line (e.g., 412(a)) may correspond to a particular "class" of phone card, e.g., famous athletes, actors, scenic locations, or the like. Upon accessing a particular class, service provider 308 may be configured to accept a selection from the caller (e.g., in response to a prompt from provider 308) from among members of the class. For example, a single predetermined access telephone number associated with incoming line 412(a) may correspond to "actors". Upon accessing the system, the caller may enter (e.g., via the caller's telephone keypad) a first code to select Humphrey Bogart voice prompts, a second code to select John Wayne voice prompts, and so on. Thus, service provider 308 may be configured to accommodate a large number of incoming telephone lines to thereby facilitate the communication of audio indicia from the audio library managed by processor 406.

With continued reference to FIG. 4, processor 406 is suitably configured to retrieve appropriate software modules from ROM 409 to appropriately access audio indicia from the audio library, to access prepaid accounts in database 310, or to process phone calls.

With continued reference to FIG. 4, in a preferred embodiment of the present invention, database 310 suitably comprises an account database 411 for storing and managing various aspects of the prepaid accounts and an audio database or voice library 420 for storing audio indicia (e.g., prerecorded voice message) or sound bites corresponding to the images associated with various telephone cards. Audio library 420 may be stored in any suitable medium that may be conveniently accessed by processor 406, such as read only memory (ROM), random access memory (RAM), compact discread only memory (CD-ROM), tape drives, a digital "voice mailbox" matrix, or the like.

In accordance with a further aspect of the present invention, when a user accesses service provider 308 using a particular access telephone number 140, processor 406 suitably retrieves appropriate audio indicia or sound bites from audio storage facility 420. Processor 406 then suitably directs the sound bites to the user via hardware link 322 to telephone 306.

Referring now to FIGS. 3 and 4, a consumer may use telephone card 100 to place long distance telephone calls in the context of the distributed processing system in the following manner.

In a preferred embodiment, data entry module 306 suitably comprises a conventional touch tone telephone. The consumer in possession of (or otherwise knowing the contents of) instrument 100 executes the instructions set forth thereon through an appropriate keypad 316 associated with telephone 306. In an alternateembodiment, it may be desirable to enter certain data into data entry terminal 306 through an alternative input/output modality via module 318, for example by reading bar code data, magnetic stripe data, voice recognition, or any other suitable medium.

With continued reference to FIGS. 3 and 4, upon dialing access number 140, the telephone call is routed by the Local Exchange Carrier (LEC) 320 to service provider 308 associated with the aforementioned toll free telephone number. In a preferred embodiment of the invention, service provider network 308 determines which image is on card 100 based upon, for example, the access phone number 140 dialed by the user. For example, the Elvis Presley phone card suitably has an access phone number specific to the Elvis card; the Marilyn Monroe phone card suitably has an access phone number specific to the Marilyn card; and a horse phone card has an access phone number corresponding to the horse card. Other methods, of course, may also be employed for determining which picture phone card is being used. For example, in an alternate embodiment, a similar access phone number 140 is issued for all the picture phone cards. Upon access by the user, service provider network 308 then prompts the user for which card is being used (e.g., "Press 1 to speak with Elvis, press 2 to speak with Marilyn Monroe; press 3 if using the antique automobile card . . . ").

After determining which picture phone card 100 is being used, controller 406 then retrieves the appropriate portion of audio indicia (e.g., voice recordings) from audio library 420 and relays it to the user over telephone line 322. Additional information is then requested from the user (e.g., using Elvis' voice if an Elvis phone card was used) such as access code 142 and a destination phone number.

In a preferred embodiment, the user enters data into data entry module 306 through keypad 316; however, it may also be desirable under certain circumstance to employ voice recognition circuitry within service provider 308 to permit the consumer to "speak" information into data entry terminal 306. In any event, once the information pertaining to authorization code 142 is received by service provider 308, a correlation is made between authorization code 142 and a particular account resident in account database 411. Upon determining the current available "balance" in the account, the service provider may inform the consumer (e.g., using Elvis' voice) of the amount of long distance time available in the account or any other relevant parameter.

Upon entering the desired destination telephone number into data entry terminal 306, service provider 308 connects or otherwise permits the connection of telephone 306 with a requested destination telephone extension 312. In the illustrated embodiment, destination 312 suitably corresponds to the telephone extension of the area code and phone number entered into data entry module 306 by the consumer. During the course of successive long distance telephone calls, service provider 308 incrementally decreases the available balance in the consumer's account until the account is fully withdrawn, at which time service provider 308 may inform the calling party (e.g., using Elvis' voice) that the account is fully withdrawn and either invite the calling party or the called party to make other arrangements for payment in order to continue the call, or simply terminate the call.

Figure 5:
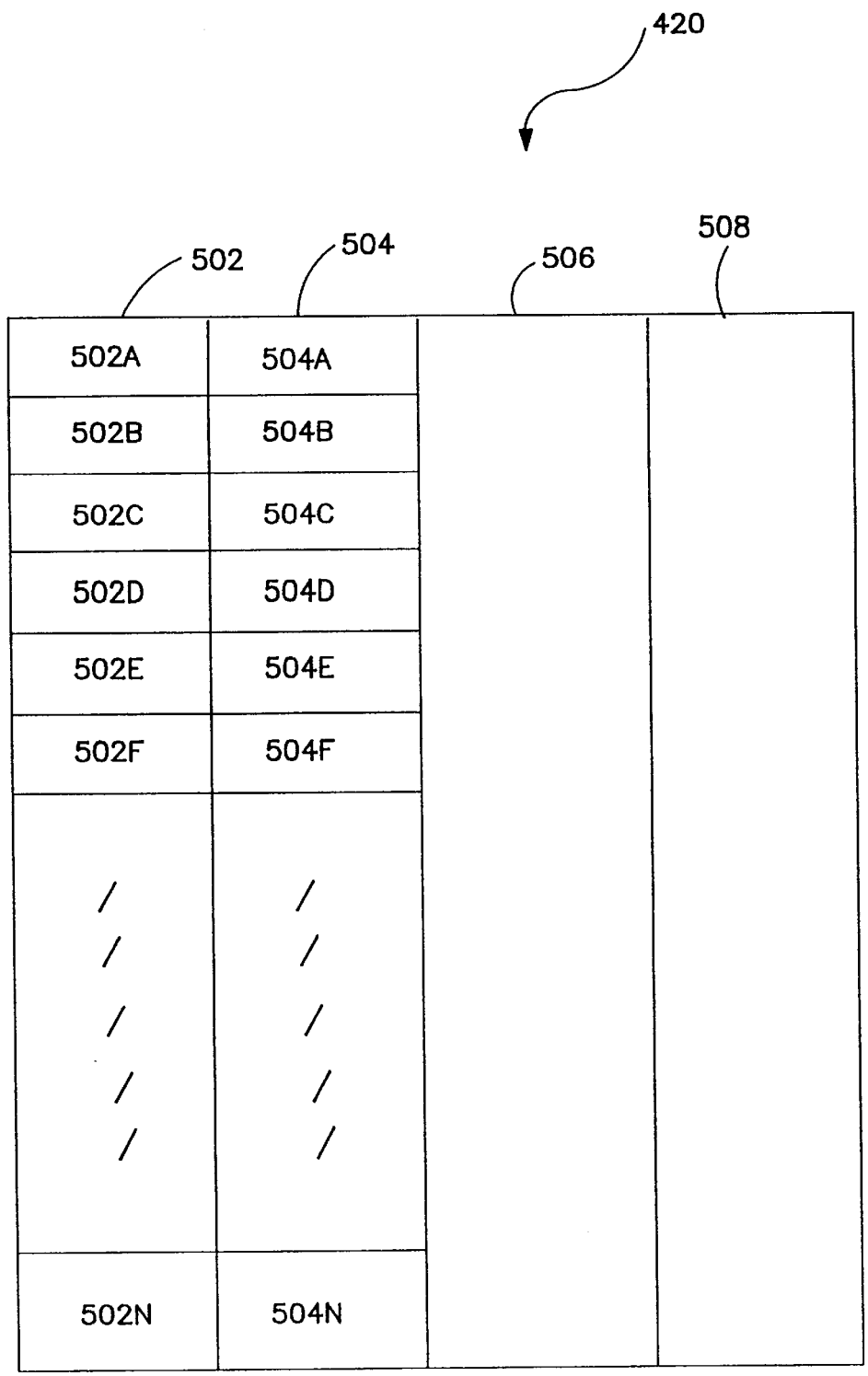
FIG. 5 is a schematic representation of a voice library for storing voice reproductions or recordings of people pictured on corresponding telephone cards.

Referring now to FIG. 5, in a preferred embodiment of the present invention, voice library 420 comprises a plurality of records 502, 504, 506, 508, etc., each record comprising a suite of audio indicia or sound bites corresponding to a particular image on transaction card 100. For example, record 502 may comprise all the voice recordings of Elvis Presley for playback to Elvis card users, record 504 may comprise all the voice recordings of Marilyn Monroe for playback to Marilyn Monroe card users, and so on.

In accordance with the illustrated embodiment of FIG. 5, each record suitably comprises a plurality of fields, e.g., the Elvis record comprises fields 502A, 502B, 502C, 502D, and so on. Each field in a record comprises a sound bite (e.g., a sound bite may be comprised of a plurality of sound snippets taken from a movie, interview, etc.) that may be suitably retrieved by processor 406 and relayed to the telephone card user over telephone line 322 at appropriate times during the placing of a long distance call. Alternatively, certain snippets may also be at least partially synthesized (e.g., digitally) or generate by an impersonator.

With continued reference to FIG. 5, if record 502 comprises the Elvis record, each field of record 502 may contain a sound bite (i.e., recording of Elvis' voice). For example, Elvis sound bites may include "I'm glad you called" (field 502A); "Punch in your special code now" (field 502B); "You have__dollars left on your phone card" (field 502C); "Can I have your phone number now" (field 502D); "Your call cannot be completed" (field 502E); "One minute remaining" (field 502F); "Thank you for calling, goodbye" (field 502N); and so on.

In accordance with one aspect of the present invention, when service provider 308 receives a call from an Elvis telephone card user, instructions resident in ROM 409 direct microprocessor 406 to access field 502A. The sound bite in field 502A of Elvis' voice is then redirected through microprocessor 406 and communicated to the Elvis phone card user. Microprocessor 406, in accordance with software in ROM 409, then retrieves the sound bite from field 502B which instructs the card user to enter authorization code 142. After a code is entered, processor 406 searches the Elvis authorization codes in account database 411. If a number is entered that does not match a list of Elvis authorization codes, controller 406 is redirected to field 502B and the user is again prompted for the authorization code. If a correct authorization code is not entered by the card user within a predetermined number (e.g., three) of attempts, controller 406 is directed to field 502E which informs the caller that the call cannot be completed. Controller 406 is then directed to field 502N where the phone card user is thanked (e.g., by Elvis) for using the phone card system and the call terminated. On the other hand, if a correct authorization code is entered in response to field 502B's request, microprocessor 406 "speaks" to the user the sound bite from field 502C which informs the user of how many units or how much time is remaining in the card. Next, a sound bite from field 502D requesting the desired phone number is relayed by the microprocessor to the user. Once the call connection is made, time paid for by the user will incrementally decrease. When the point is reached where there is only one minute remaining in the user's account, controller 406 is directed to field 502F and plays the message "One minute remaining." If the call is not terminated by the user within a minute, microprocessor 406 reads from field 502N the voice message "Thank you for using American Express, goodbye" and then terminates the call.

It will be appreciated that various other fields or subfields may also be incorporated into record 502 in addition to, or in lieu of, one or more of the above-described fields.

Sound bites for other people, animals, automobiles, or the like may be stored in records in audio library 420 in a similar manner. Host computer 308 may determine which picture telephone card is being used by a variety of methods such as allocating specific phone numbers for each set of picture phone cards or prompting the user at the time of access which picture card is being used.

Figure 6:
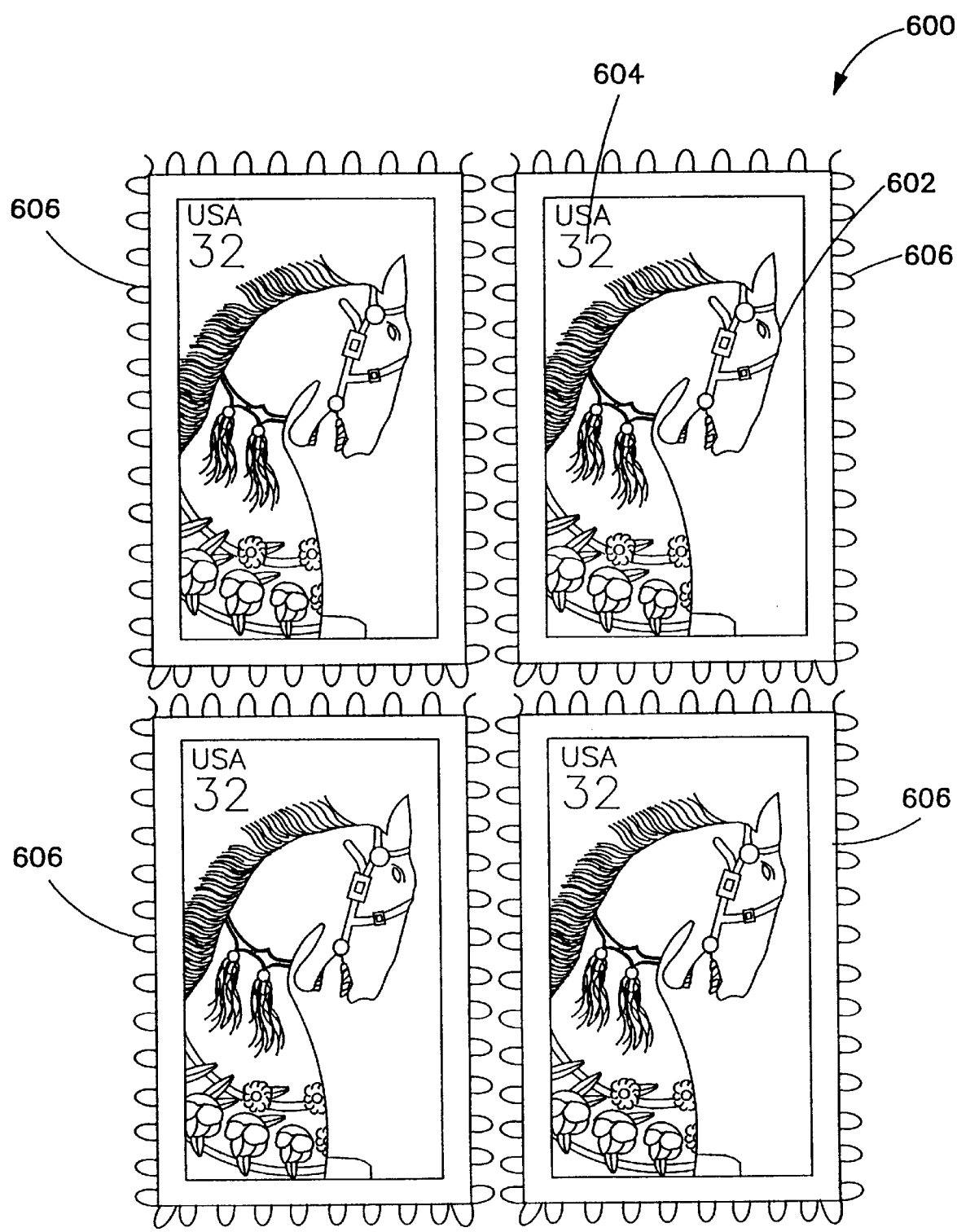
FIG. 6 is a series of postage stamps issued with the telephone card of FIGS. 1 and 2 in accordance with the present invention.

Turning now to FIG. 6, in accordance with another aspect of the invention, a single postage stamp 606 or a series of postage stamps 600 may be distributed to a purchaser of transaction card 100 in a telephone card set or ensemble. These telephone card sets may be distributed through, for example, post offices, stationary stores, souvenir shops, or other stores.

Each postage stamp 606 suitably comprises an image or drawing 602 that is substantially similar or identical to image 202 on transaction card 100 (of course, the size of image 602 and image 202 may be different). A denomination 604 of stamp 606 may be of any variety, but is preferably set at a first class mail rate or a post card rate.

Although the present invention is set forth herein in the context of the appended drawing figures, it should be appreciated that the invention is not limited to the specific forms shown. Various other modifications, variations, and enhancements in the design and arrangement of the host computer, audio library, telephone card, and the like as set forth herein may be made without departing from the spirit and scope of the present invention as set forth in the appended claims.

I claim:

1. A distributed system for facilitating a commercial transaction by a consumer, comprising:
    a prepaid instrument including a service provider access telephone number, a unique account number, and a visual indicia, wherein said visual indicia is of a famous person; and
    a service provider network comprising:
        (a) an account database for storing an account balance associated with said prepaid instrument account number;
        (b) an audio library comprising an audio indicia related to said prepaid instrument visual indicia;
        (c) an output system configured to transmit said audio indicia to the consumer when the consumer accesses said service provider network wherein said audio indicia is a reproduction of a voice of said famous person, and wherein said voice instructs the consumer in making said commercial transaction; and
        (d) a processing unit for adjusting in real-time said account balance during a commercial transaction conducted by the consumer.

2. The distributed system of claim 1 wherein said instrument further comprises instructions setting forth a method for accessing said service provider network and said account database.

3. The distributed system of claim 1 wherein said prepaid instrument is a prepaid telephone card.

4. The distributed system of claim 2 further comprising:
    a second prepaid instrument comprising a second service provider access telephone number and a second visual indicia; and
    a second audio indicia stored in said audio library, said second audio indicia relating to said second visual indicia and wherein said output system transmits said second audio indicia to the consumer when the consumer accesses said service provider network using said second prepaid instrument.

5. A method for effectuating commercial transactions between a consumer and a host computer comprising:
    (a) providing a database associated with the computer, said database comprising an audio indicia and a plurality of accounts;
    (b) providing a prepaid transaction instrument for use by the consumer, said prepaid transaction instrument comprising an authorization code for accessing said host computer and a visual indicia related to said audio indicia;
    (c) communicating said audio indicia to the consumer when said host computer is accessed by the consumer for making a commercial transaction;
    (d) inputting said transaction request from the consumer;
    (e) appropriately increasing or decreasing the balance of one of said plurality of accounts associated with said transaction instrument authorization code during said transaction; and
    (f) issuing to the consumer a postage stamp with said transaction instrument, said postage stamp having an image of to said visual indicia on said transaction instrument.

6. The method of claim 5 wherein said audio indicia prompts said consumer in placing a telephone call.

7. The method of claim 5 wherein said audio indicia prompts said consumer in making a purchase of at least one of a good or a service.

8. The method of claim 5 further comprising the steps of: (a) notifying said consumer by a first portion of said audio indicia when said associated account in said database drops to a predetermined value; and (b) instructing said consumer by a second portion of said audio indicia in increasing the balance of said associated account.

9. The method of claim 5 wherein said prepaid transaction instrument comprises a first side comprising an access telephone number for accessing said host computer and said authorization code, and a second side comprising said visual indicia.

10. A computer system for placing telephone calls with a prepaid telephone card, comprising:
    an incoming call trunk for connecting to a prepaid telephone card holder;
    an outgoing call trunk for connecting to a desired telephone number;
    an account database for storing an account balance associated with an account code on said telephone card;
    an audio library for storing a voice message, said voice message comprising a voice reproduction of a person pictured on said telephone card; and
    a central processing unit configured to receive said account code from said card holder, prompt said card holder with said voice message in making telephone call-related transactions, connect said card holder to said desired telephone number, and incrementally decrease said account balance associated with said account code during the call connection to said desired telephone number.

11. The system of claim 10 wherein said audio library comprises a plurality of voice messages including a plurality of voice reproductions of different persons; and said central processing unit is configured to appropriately transmit to said card holder the voice reproduction corresponding to the person pictured on the telephone card of said card holder.

12. The system of claim 10 wherein a first message of said voice messages appropriately notifies said card holder when said account balance in said account database drops to a predetermined value and a second message of said voice messages instructs said card holder in increasing said account balance.

13. The system of claim 10 further comprising a postage stamp issued with said telephone card, said postage stamp having an image of a person identical to said person pictured on said telephone card.

14. The system of claim 10 wherein said telephone card has a first side and a second side, said first side comprising said account code and said second side comprising an image of said person.

15. A method for placing a phone call with a prepaid telephone card, the telephone card having an account number and an image of a person, comprising:

provFiding a balance associated with said telephone card account number in an account database;

providing an audio library comprising a plurality of voice messages from said person pictured on said telephone card, and wherein at least one of said voice messages instructs a calling party on placing a telephone call with said telephone card;

receiving said telephone card account number from said calling party;

transmitting said instructing voice message from said audio library to said calling party;

inputting a desired telephone number from said calling party; and decreasing said balance in said account database during the duration of the connection to said desired telephone number.

16. The method of claim 15 further comprising the steps of: (a) notifying said calling party with another of said plurality of voice messages when said account balance in said account database reaches a predetermined value; and (b) instructing said calling party in recharging said account balance.

17. The method of claim 15 further comprising the step of issuing a postage stamp with said telephone card, said postage stamp having an image identical or similar to said person pictured on said telephone card.

* * * * *